US011772177B2

(12) United States Patent
Taborelli et al.

(10) Patent No.: US 11,772,177 B2
(45) Date of Patent: Oct. 3, 2023

(54) METHOD FOR HIGH-SPEED WIRE CUTTING

(71) Applicant: Agie Charmilles SA, Losone (CH)

(72) Inventors: Marco Taborelli, Villa Guardia (IT); Reto Knaak, Ascona (CH)

(73) Assignee: Agie Charmilles SA

( * ) Notice: Subject to any disclaimer, the term of this patent is extended or adjusted under 35 U.S.C. 154(b) by 169 days.

(21) Appl. No.: 17/395,178

(22) Filed: Aug. 5, 2021

(65) Prior Publication Data

US 2022/0040775 A1 Feb. 10, 2022

(30) Foreign Application Priority Data

Aug. 7, 2020 (EP) .................................... 20189965

(51) Int. Cl.
*B23H 3/02* (2006.01)
*B23H 5/02* (2006.01)
*B23H 7/04* (2006.01)

(52) U.S. Cl.
CPC .................. *B23H 3/02* (2013.01); *B23H 5/02* (2013.01); *B23H 7/04* (2013.01); *B23H 2300/12* (2013.01)

(58) Field of Classification Search
CPC ........ B23H 2300/12; B23H 3/02; B23H 5/02; B23H 7/04
See application file for complete search history.

(56) References Cited

U.S. PATENT DOCUMENTS

| 4,487,671 | A | 12/1984 | McGeough |
| 4,702,138 | A | 10/1987 | Hattori et al. |
| 5,833,835 | A | 11/1998 | Gimaev et al. |
| 10,680,495 | B2 | 6/2020 | Taborelli |
| 10,877,458 | B2 | 12/2020 | Taborelli |

FOREIGN PATENT DOCUMENTS

| CN | 101428364 A | 5/2009 |
| CN | 101670471 A | 3/2010 |
| CN | 105195843 B | 4/2017 |
| EP | 3296050 A2 | 3/2018 |
| EP | 3360636 A1 | 8/2018 |
| JP | S5114840 A | 2/1976 |
| JP | 2015217438 A | 12/2015 |

OTHER PUBLICATIONS

CN-111151831-A, and translation (Year: 2020).*

(Continued)

*Primary Examiner* — Nicholas A Smith
(74) *Attorney, Agent, or Firm* — Harness, Dickey & Pierce, P.L.C.

(57) ABSTRACT

High-speed wire electrochemical-discharge cutting method (HS-WECDM), in which a work piece is processed by means of a wire electrode, in which consecutive negative polarity pulses are applied at said wire electrode, thereby at least partially developing discrete electrical discharges, wherein the method further includes, applying positive polarity pulses at the wire electrode between the negative pulses, and that an ignition occurring with each positive polarity pulse is immediately detected, and that the positive polarity pulses are immediately interrupted.

15 Claims, 8 Drawing Sheets

(56) References Cited

OTHER PUBLICATIONS

Extended European Search Report dated Feb. 26, 2021 for Application No. 20189965.5 (5 pages).
Extended European Search Report for Application No. 20183870.3 dated Dec. 8, 2020 (8 pages).
Wang Wei, et al. "Surface burning of high-speed reciprocating wire electrical discharge machining under large cutting energy", Int J Adv Manuf Technol (2016) (8 pages).
3D Systems Leaflet "CUT AM 500" (2 pages).

* cited by examiner

METHOD FOR HIGH-SPEED WIRE CUTTING

CROSS-REFERENCE TO RELATED APPLICATIONS

This application claims priority to European Patent Application No. 20 189 965.5 filed Aug. 7, 2020 all of which is incorporated by reference in its entirety.

BACKGROUND

Technical Field

The invention relates to a method for wire electrochemical-discharge cutting, in particular a pulse forming method for high-speed wire electrochemical-discharge cutting.

Discussion

The wire electrical discharge machining process (WEDM) is a non-traditional process for precisely cutting electrically conductive materials. A desired contour is cut in a work piece by means of a wire electrode. Wire and work piece are moved relatively to each other according to the instructions of a machining program. The process is conducted by applying a pulsed voltage between the work piece and the wire, provoking spark discharges at the interelectrode space (Gap).

The WEDM process is versatile and extremely accurate, so that WEDM machines are widely used, in particular to produce dies and punches for stamping. The WEDM process is carried out with the work piece immersed in a dielectric fluid bath or using coaxial flushing, mostly deionized water of very low conductivity or oil. The wire electrode is fed from a spool at run-off speeds typically ranging from 30 to 300 mm/s. In WEDM the wire travels always in the same direction and is used only once.

In contrast, the method disclosed herein relates to high-speed wire electrochemical-discharge cutting. This electrical cutting method is sometimes called fast-wire cutting, reciprocating wire cutting, high-speed WEDM or simply HS-WEDM or HS-WECDM or FW. In the following it is referred to as High-speed wire cutting process or HS-WECDM. The HS-WECDM process is also conducted by applying a pulsed voltage to the gap, but this process is very different with respect to traditional WEDM.

The wire traveling direction is periodically reciprocated, so that the molybdenum wire is used many times, which is possible because of the low wire wearing. Moreover, the traveling speed of the wire is up to 20 m/s, i.e. much higher than that in traditional WEDM. For this reason, WEDM is sometimes called low-speed WEDM (LS-WEDM). In HS-WECDM and LS-WEDM machines, the wire traveling direction is generally vertical, with the machining liquid fed by means of coaxial nozzles, i.e. by aspersion. The machining fluid used in HS-WECDM is a fluid having medium conductivity of about 3 mS/cm. In the present specification it is therefore referred to as electrolyte. The high wire traveling speed of HS-WECDM ensures good flushing by entraining the electrolyte into the kerf, so that normally machining takes place without a machining liquid bath.

The accuracy and versatility of HS-WECDM machines is not com-parable to LS-WEDM, however these machines are good for a wide quantity of operations such as separating, repartitioning, slicing and slotting tasks. Moreover, their price/performance ratio is attractive.

Recently, GF Machining Solutions presented the AgieCharmilles CUT AM 500; a new reciprocating wire cutting machine, which is specially designed to separate additively manufactured metal parts from a baseplate (see GF Machining Solutions leaflet 259.806.892-EN). This machine is a HS-WECDM in which the wire travels horizontally across the machining area. The baseplate is mounted on a rotary table by which it is rotated by 180° after the loading. The process is thus carried out with the base plate turned upside-down, as shown in EP3360636A1. In this way AM-parts to be detached do not obstruct the kerf while cutting, and dropping AM-parts are easily collected.

In electrical machining processes, the flushing is a key fac-tor. In horizontal cutting, the feeding of the machining fluid in the kerf is more difficult, in particular due to gravity. In the case described here above of a wire cutting machine dedicated to the separation of additively manufactured metal parts, an additional difficulty is given by the fact, that typically several AM-parts are generated simultaneously on the baseplate, forming an array of parts being spaced apart from each other. The flushing of such parts is very difficult.

For these reasons, with the above mentioned horizontal HS-WECDM machine, operation is preferably conducted in a machining fluid bath. A fluid bath ensures the permanent flushing of the kerf.

A reciprocating HS-WECDM in which a wire electrode travels horizontally in a work tank to process a submerged work piece is known for instance from CN101428364A or CN101670471A.HS-WECDM process is normally conducted with unipolar negative polarity pulses at the wire electrode. Negative polarity of cutting electrode results in that the material removal occurs substantially at the workpiece side, preserving the integrity of the molybdenum wire electrode. At the opposite, positive polarity of pulse generator at the wire would cause erosion to occur at the wire side, leading to wire breakage.

As said, in HS-WECDM machine having a vertical traveling wire electrode, the flushing is typically carried out by aspersion. Here the machining fluid is injected in the kerf by means of top and bottom flushing nozzles and dragged by the traveling wire. The cathode is represented by the portion of the wire inside the kerf, and the anode is represented by the near-by portion of work piece surrounding the wire. The distant portion of the work piece which is not adjacent to the wire is still at anode potential, but is not sprinkled by the electrolyte. So, apart from the cut surface itself, only a small portion of the upper and lower work piece surface is affected by the unwanted anodic oxidation.

Unfortunately, in an electrolyte bath this unipolar HS-WECDM method leads to huge problems in operation, in particular ex-tended anodic oxidation of the work piece, decomposition of the machining fluid, formation of deposits in the entire working area, including the wire traveling circuit and current feeders. These problems cause considerable effort in maintenance.

The reason is that the machining fluid used in this HS-WECDM process is an electrolyte and that the electrodes are substantially submerged. With unipolar operation, the machining area becomes an electrolytic cell, in which the wire is the negative electrode (cathode) and the work piece is the positive electrode (anode). The unipolar operation leads to anodic oxidation at the work piece. Of course, this applies to both, vertical and horizontal HS-WECDM operating in an electrolyte bath.

In a horizontal HS-WECDM machine operating in an electrolyte bath, the cathode is represented by the submerged section of the wire electrode, whereas the anode is represented by the submerged work piece, the submerged part of the work-table and the work tank (if metallic). In such case, the entire work piece surface may undergo to unwanted anodic oxidation. For instance, titanium AM-parts may form a coloured oxide film. In addition, since the AM-parts are cut in close proximity of the baseplate surface, said baseplate is also subject to intense oxidation.

Thus, smooth operation of said horizontal HS-WECDM machine is not possible with conventional pulse technology.

SUMMARY OF THE INVENTION

An aspect of the present invention is to solve the mentioned problem of anodic oxidation while maintaining high cutting rates, ensuring high process reliability and very low wear of wire electrode. In substance, this aspect is achieved by the inventive pulse shaping, aiming at a set-point gap voltage, for instance a zero- or near-zero average gap voltage. The main aspect of the present invention is addressed to a high-speed wire electrochemical-discharge cutting method (HS-WECDM), in which a work piece is processed by means of a wire electrode, in which consecutive negative polarity pulses are applied at the wire electrode, the negative polarity pulses having open circuit voltage $U_{o2}$, thereby at least partially developing discrete electrical discharges. The method further includes applying positive polarity pulses at the wire electrode between the negative pulses. The positive polarity pulses have a positive polarity open circuit voltage $U_{o1}$, and an ignition occurring with each positive polarity pulses is immediately detected, and the positive polarity pulses are immediately interrupted.

Another aspect of the present invention is addressed to a high-speed wire electrochemical-discharge cutting method (HS-WECDM), in which consecutive pulse periods are applied to the gap between said work piece and said wire electrode, and that each pulse period comprises at least one positive polarity pulse at the wire electrode in which a positive open circuit voltage $U_{o1}$ is applied, and that each pulse period further comprises a negative polarity pulse at the wire electrode in which a negative open circuit voltage $U_{o2}$ is applied, and that an ignition occurring in the course of said at least one positive polarity pulse is immediately detected, and that such positive polarity pulse is immediately interrupted, and that in a negative polarity discharge occurring in said negative polarity pulse is sustained during a discharge time $t_{e2}$.

Another aspect of the present invention is addressed to achieve a zero- or near-zero average gap voltage. Accordingly, one or more machining parameters are controlled to achieve a zero- or near-zero average gap voltage.

Another aspect of the present invention is addressed to the identification and suppression of low steepness positive polarity pulses.

Still another aspect of the present invention is addressed to achieve a zero- or near-zero average gap voltage, by including Positive Pause Voltage pulses.

These and other aspects are described in the following description of preferred embodiments.

BRIEF DESCRIPTION OF THE DRAWINGS

Preferred embodiments of the invention will now be detailed with reference to the attached drawings, which illustrate the following.

DESCRIPTION OF THE PREFERRED EMBODIMENTS

Figure 1:
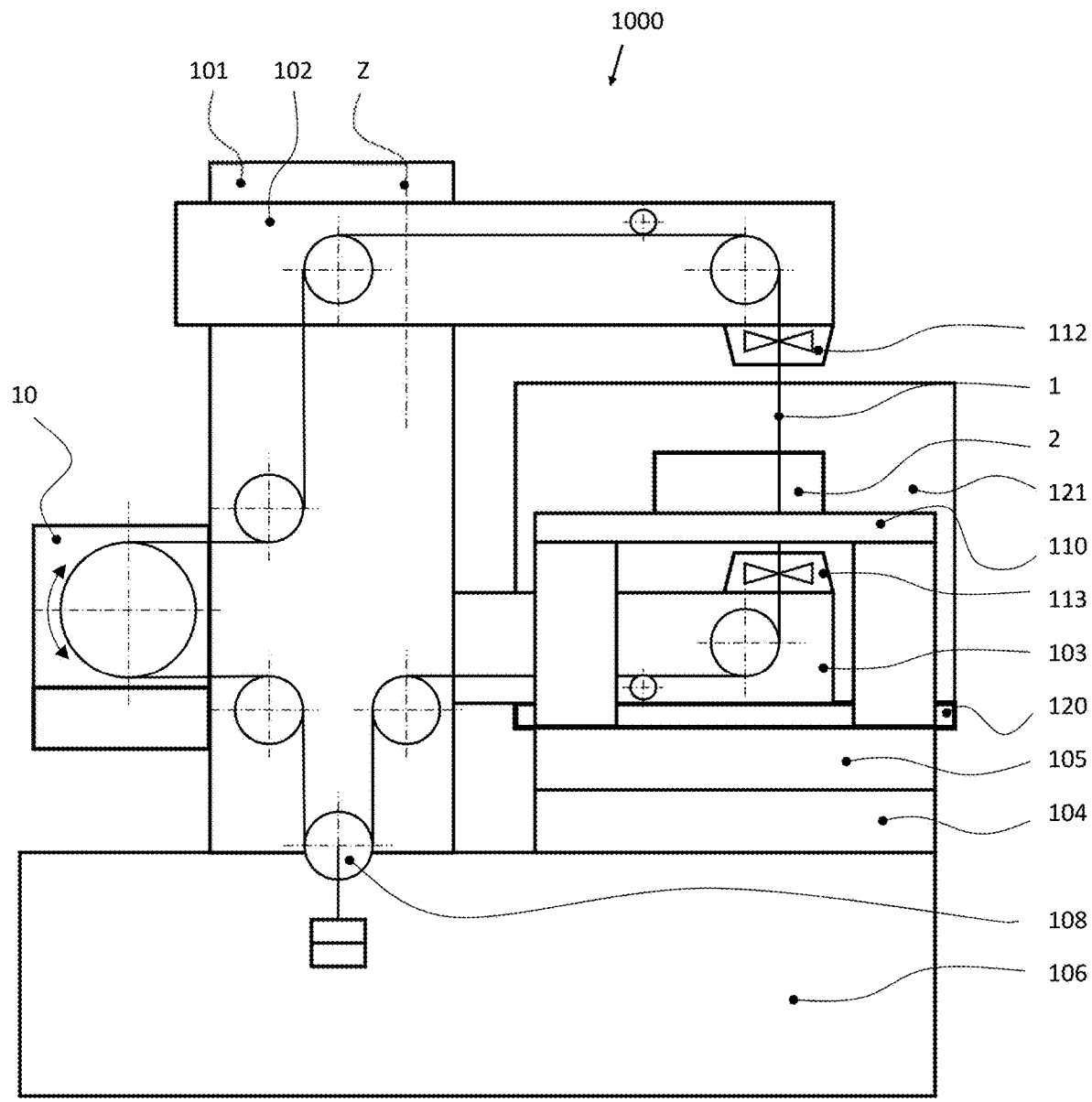
FIG. 1 An aspersion type HS-WECDM with a reciprocating wire electrode, in which the wire travels vertically across the machining area.

First, some relevant characteristics of HS-WECDM machines are explained and illustrated by means of the figures. FIG. 1 shows an exemplary high-speed reciprocating wire cutting machine 1000, comprising a base 106, with a column 101 mounted on it. A beam 102 is mounted at column 101 on a Z-slide, represented by the chain line Z, so that an upper wire guiding head 112 can be positioned vertically. A lower wire guiding arm 103 bearing a lower wire guiding head 113 is fixedly mounted at the column 101. An X-slide 104 a Y-slide 105 and a table 110 are mounted in series on the base 106 so that a work piece 2 mounted on table 110 can be moved in the X/Y-plane. A work tank 120 with a splash guard 121 surrounds the table to collect the electrolyte. The wire is stored on a wire drum assembly 10. The wire is unwound from the drum 10, travels through the wire traveling circuit and is then rewound to said drum, in known manner. This figure illustrates the conventional reciprocating wire aspersion-type HS-WECDM machine (no bath), in which the wire travels vertically through the machining area.

Figure 2:
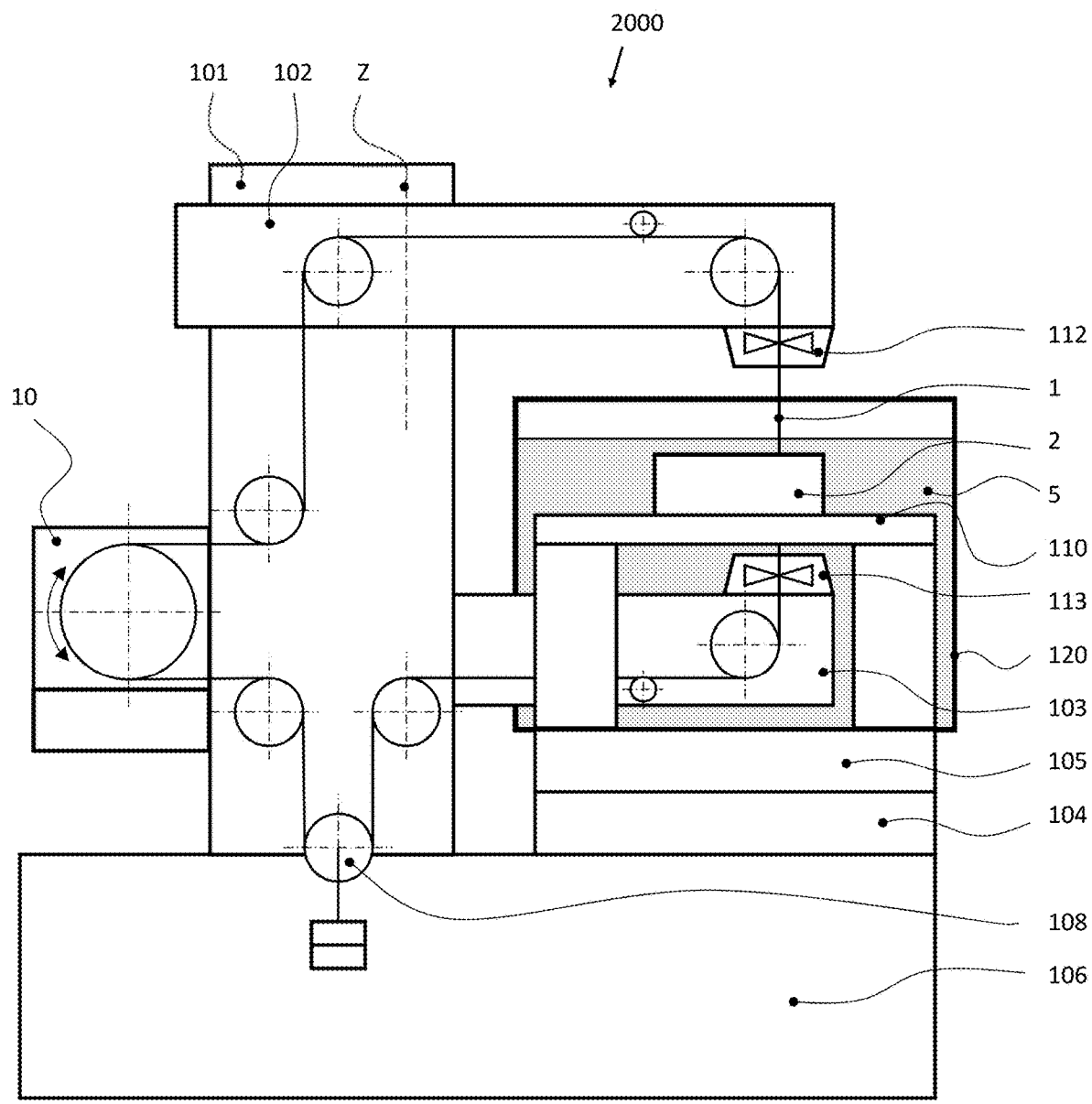
FIG. 2 A HS-WECDM similar to the one shown in FIG. 1, with a work tank and a bath for submerged processing.

FIG. 2 shows a similar high-speed reciprocating wire cutting machine 2000, but this is a bath-type HS-WECDM machine where the work piece is submerged in operation. Work tank 120 extends above the work piece level to contain an electrolyte bath 5.

Figure 3:
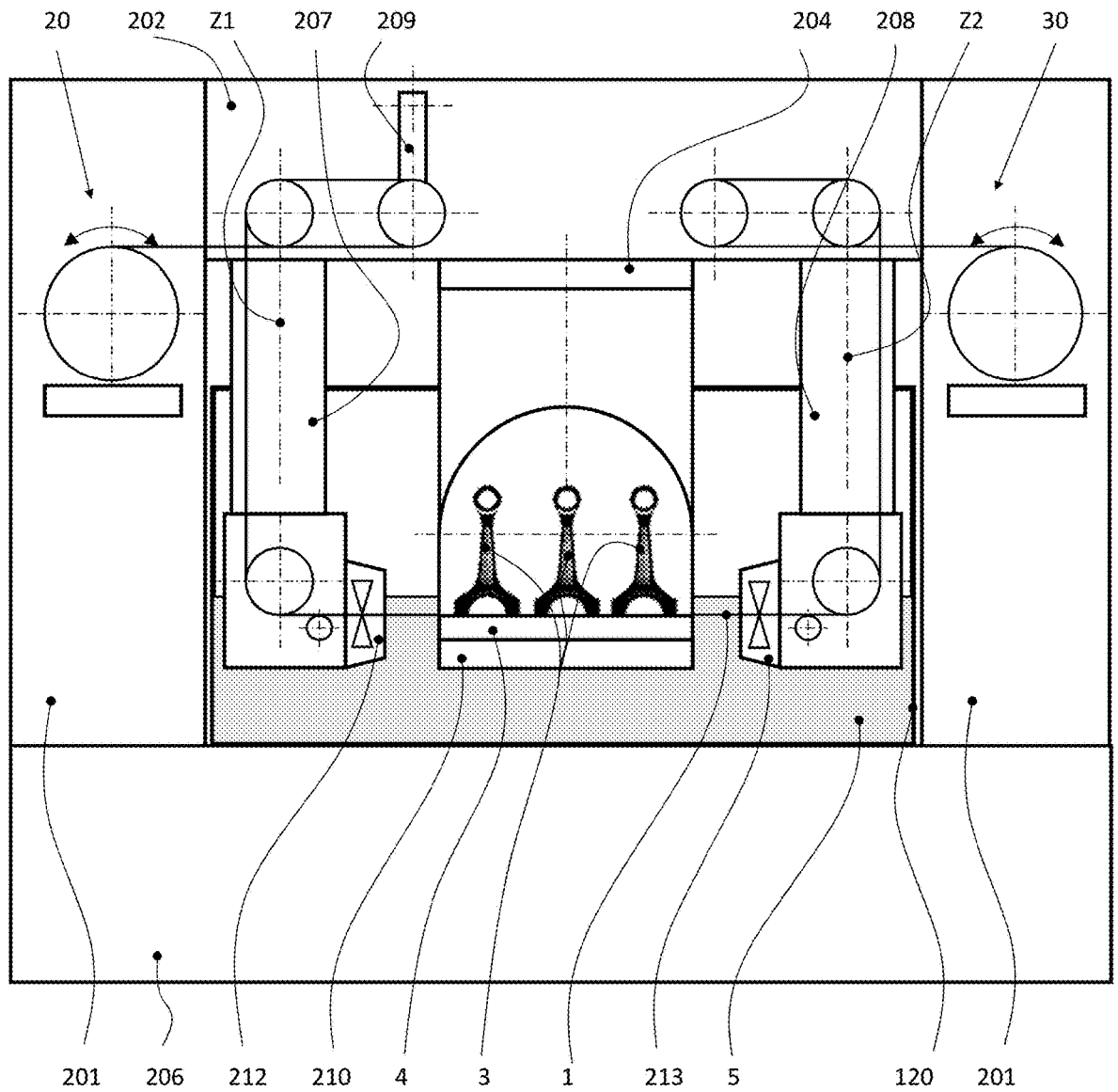
FIG. 3 A HS-WECDM with a reciprocating wire electrode, in which the wire travels horizontally across the machining area in a bath.

FIG. 3 shows another exemplary high-speed reciprocating wire cutting machine 3000. This machine has a wire traveling circuit, in which the wire electrode travels horizontally through the work area, i.e. for horizontal cutting. The machine 3000 comprises a base 206 and a left- and a right column 201 mounted on said base. A beam 202 is mounted between the columns 201. A left wire guiding arm 207 bears a left wire guiding head 212, and wire guiding arm 207 is mounted on a left Z-slide, which is represented by the chain line Z1. A right wire guiding arm 208 bears a right wire guiding head 213, and wire guiding arm 208 is mounted on a right Z-slide, which is represented by the chain line Z2. In this way, the two guiding heads 212, 213 can be positioned vertically. The Z-slides Z1, Z2 are either coupled or independent. The wire is stored on a double wire drum assembly 20,30.

A baseplate 4 with several AM-parts 3 built on it is mounted on a rotary table 210, which in turn is mounted on a Y-slide 204. The Y-slide is mounted under the beam 202.

Figure 4:
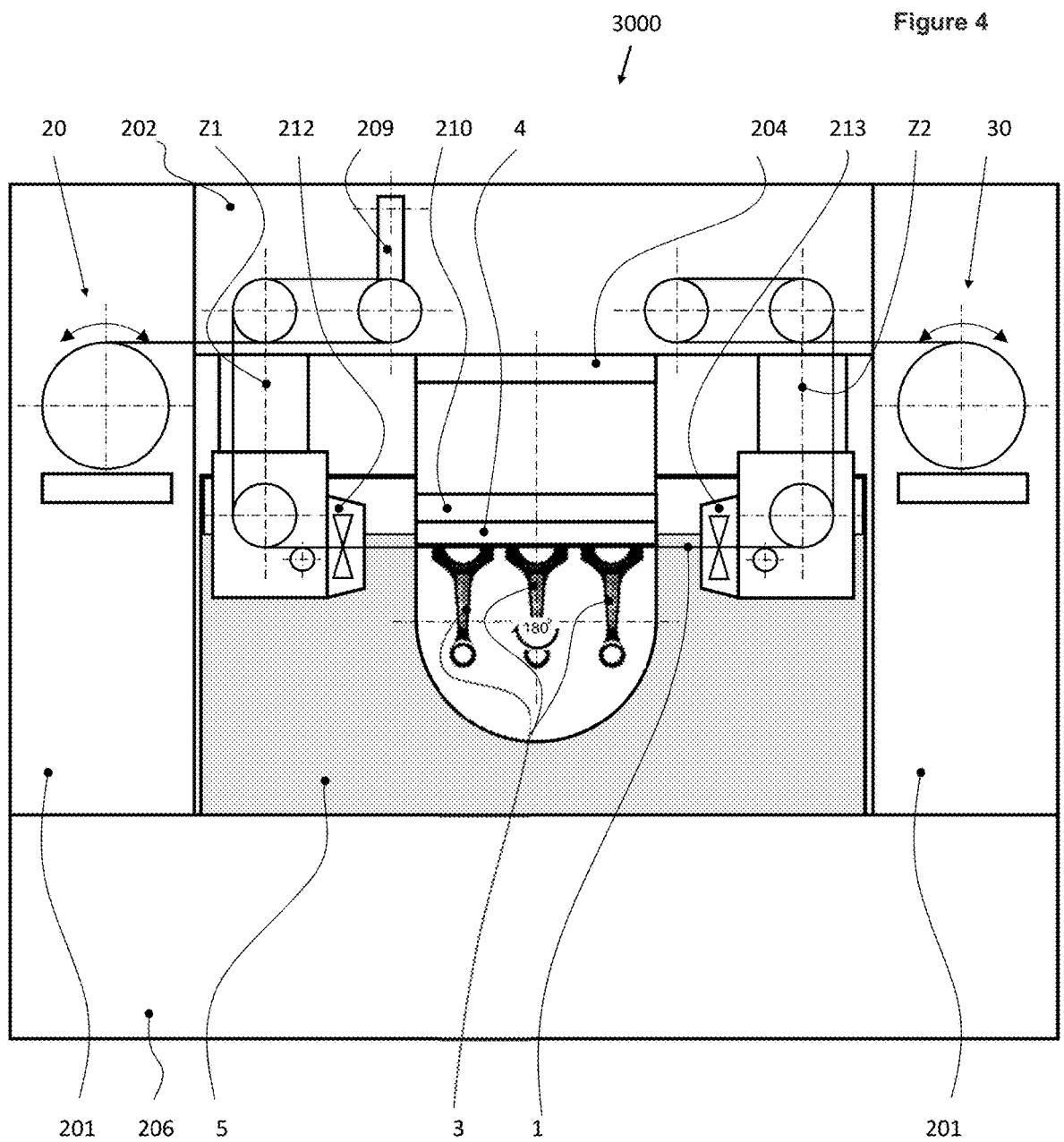
FIG. 4 The HS-WECDM shown in FIG. 3, in which the work piece is rotated upside-down.

FIG. 4 shows the same machine shown in FIG. 3, but with the rotary table 210 rotated by 180°, and a work tank 120 filled with an electrolyte 5 such that the fluid level is slightly above the cutting position.

Of course, the separation cut can be carried out in the original orientation, with the AM-parts looking upwards as shown in FIG. 3. However, AM-parts may drop or close the kerf in the course of the separation. For this reason, in most of the cases it is of advantage to rotate the baseplate, as show in FIG. 4. The base plate 4 is loaded in the original orientation. It is then rotated by 180° by means of the rotary table 210 to execute the separation cut with AM-parts looking downwards. Here the dropping AM-parts are easily collected, for instance by means of a fitting basket.

The Z-slides Z1 and Z2 are moved to the desired position, typically to the immediate vicinity of the baseplate 4. The work tank 120 is filled with the electrolyte 4 and the AM-parts are separated from the baseplate by means of a high-speed reciprocating wire cutting process, whereas the flushing of the gap is ensured by the electrolyte dragged into the kerf by the wire traveling at high speed.

Figure 5:
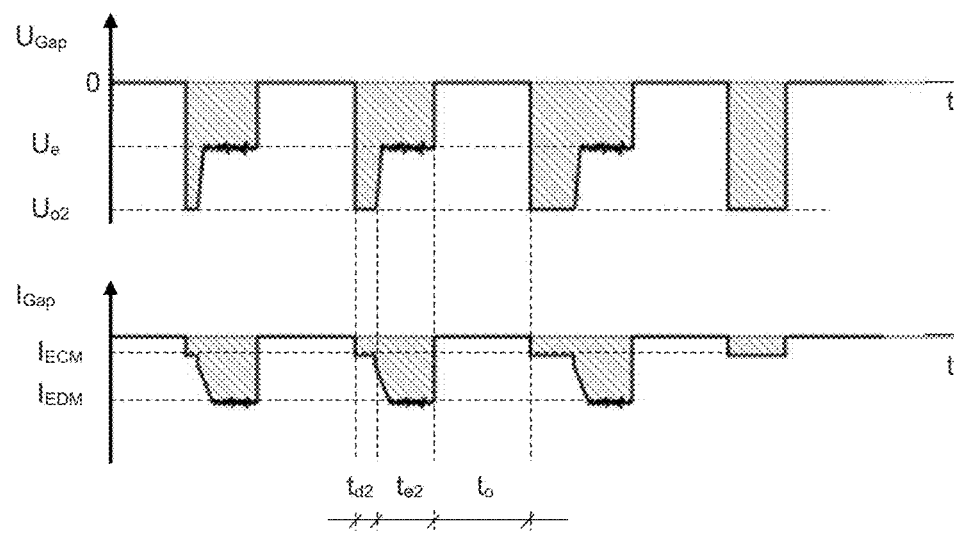
FIG. 5 A voltage and current waveform of a state of the art HS-WECDM process.

FIGS. 5 to 14 illustrate voltage (gap voltage, $U_{Gap}$) and current (gap current, $I_{Gap}$) waveforms. First, the typical voltage and current waveform of pulses used with a conventional HS-WECDM are described with reference to FIG. 5. Four negative polarity pulses are shown. Note that the first three pulse periods shown in FIG. 5 are normal pulses having a characteristic voltage drop at an ignition delay time, while the fourth pulse period is an open circuit pulse. No discharge occurs in open circuit pulses, but it contributes to the negative average gap voltage.

Conventional HS-WECDM machines are generally of aspersion type. These machines use unipolar pulses, having negative polarity at the wire electrode, as illustrated in FIG. 5. The main phases of a normal pulse period used with a conventional HS-WECDM comprises:

applying a negative voltage $U_{o2}$ at the gap during an ignition delay time $t_{d2}$, and having a maximum ignition delay time $t_{d2max}$;

after ignition, electrical discharge machining with negative polarity during a time $t_{e2}$; and, applying a pause time $t_o$ between two consecutive pulses.

A considerable negative average gap voltage is typical for this machine type (downwards hatched area), which is not a huge problem in aspersion type HS-WECDM. But in an electrolyte bath, the currents cause strong electrolytic phenomena. As can be seen from the graph of the current, during the delay time $t_{d2}$ the current $I_{ECM}$ is not zero. This is due to the electrical conductivity of the machining fluid, which determines a current flow between wire and work piece when applying a voltage, also in case of open pulses. The average voltage value between cathode and anode (gap voltage) is typically in the range of −30 to −40V. This causes a redox reaction, with a current density over the work piece surface, which causes its oxidation.

Figure 6:
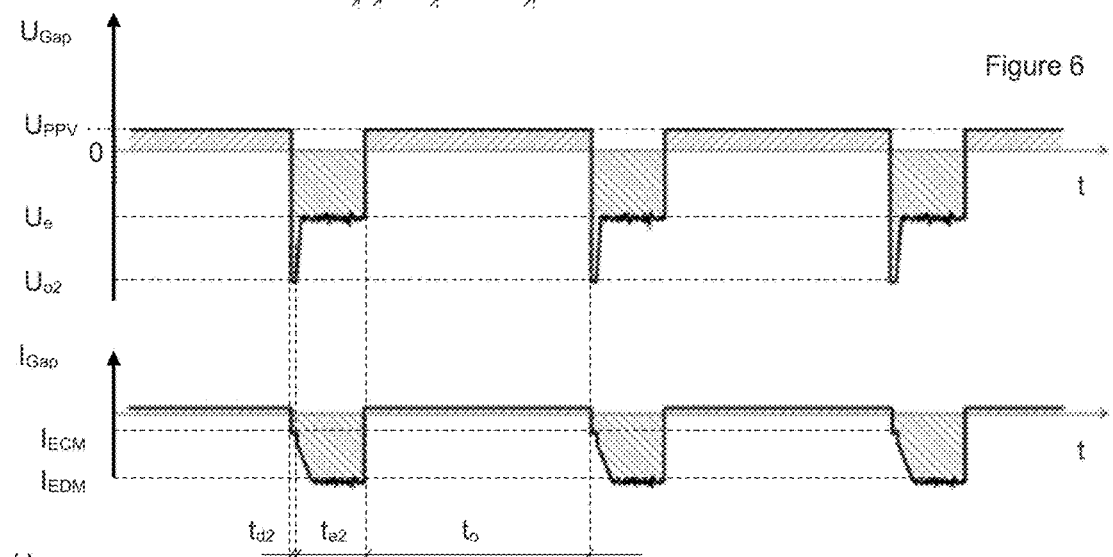
FIG. 6 A voltage and current waveform of an enhanced HS-WECDM process, using PPV-pulses.

FIG. 6 illustrates voltage and current waveforms of a provision known from LS-WEDM, which includes a "Positive Pause Voltage" or PPV-pulse. The PPV-pulse is a pulse applied in the pause between consecutive negative pulses (downwards hatched area), in which a moderate positive voltage $U_{PPV}$ (upwards hatched area) is applied to the gap. A discharge should actually not occur in said PPV-pulse. The PPV-pulse is set such as to get a zero- or near-zero average gap voltage. For instance, the pause time $t_o$ between pulses in which a PPV-pulse is impressed to the gap is prolonged to the extent needed to get zero- or near-zero average voltage. In this way, the anodic oxidation is substantially prevented. The Positive Pause Voltage must be lower than the discharge voltage $U_e$, because a discharge is not wanted during said PPV-pulse. Typically, the PPV-voltage $U_{PPV}$ is in the range of +5 to +25V, more typically between +10 and +15V. The disadvantage here is that the pause is significantly prolonged to get the full compensation. Thus, the discharge frequency is reduced, and machining rate is lowered.

Moreover, with PPV there is a risk of repeated micro-ignitions, which are not sustained by current, thus extinguish immediately. These re-ignitions diminish the compensation effect of the PPV-pulse and may contribute to wire wearing. For this reason, the use of PPV-pulses is only partially satisfying, albeit it may solve the issue of anodic oxidation.

FIG. 6 further shows negative pulses having comparably short ignition delay time $t_{d2}$, which is achieved by high gap compression, i.e. comparably small gap. This provision reduces the area U(t)×dt to be compensated (downwards hatched area) by a PPV-pulse (upwards hatched area). However, high gap compression worsens the gap cleaning, which may lead to the deterioration of the cutting process, to a reduced cutting rate and to reduced surface quality.

Conventional pulse forms are thus not suitable for an anodization-free, high-efficiency HS-WECDM process.

The present invention introduces a new pulse type, which is used in combination with conventional pulses. The new pulse type is substantially not contributing to material removal, but is especially dedicated to effectively reduce the average gap voltage, getting a desired average gap voltage, for instance zero- or near-zero voltage.

The primary aspect of the present invention is thus addressed to a high-speed wire electrochemical-discharge cutting method (HS-WECDM), in which a work piece is processed by means of a wire electrode, in which consecutive negative polarity pulses are applied at the wire electrode, the negative polarity pulses having open circuit voltage $U_{o2}$, thereby at least partially developing discrete electrical discharges, the method further includes, applying positive polarity pulses at the wire electrode between the negative pulses, the positive polarity pulses having a positive polarity open circuit voltage $U_{o1}$, and that an ignition occurring with each positive polarity pulses is immediately detected, and that the positive polarity pulses are immediately interrupted.

Upon detection of the ignition, the positive polarity pulse is interrupted as fast as possible. Interrupting the positive polarity pulse may include inverting the pulse polarity.

In a preferred embodiment, the new pulse type is embedded in pulse periods including at least one such positive polarity pulse and a negative polarity pulse. By embedding and manipulating the inventive positive polarity pulses, the average gap voltage can be controlled to achieve the desired set-point value.

More specifically, this embodiment of the inventive HS-WECDM cutting method includes that consecutive pulse periods are applied in a gap between said work piece and said wire, and that each the pulse periods comprise at least one positive polarity pulse at the wire electrode in which a positive open circuit voltage $U_{o1}$ is applied, and that the pulse periods further comprise a negative polarity pulse at the wire electrode in which a negative open circuit voltage $U_{o2}$ is applied, and that an ignition occurring in the course of said at least one positive polarity pulse is immediately detected, and that such positive polarity pulse is immediately interrupted, and that the negative polarity pulse is applied immediately after the positive polarity pulse, and that a negative polarity discharge occurring in said negative polarity pulse is sustained during a discharge time $t_{e2}$.

In other words, pulse periods include one or more first pulses in which a positive polarity voltage is applied to the wire electrode, and a second pulse, in which a negative polarity voltage is applied to the wire electrode. Ideally, there is only one positive polarity voltage pulse, however further positive polarity pulses may be applied, if the first positive polarity voltage is interrupted because of premature ignition, or for other reason. The open circuit voltage $U_{o1}$ of the first pulse of positive polarity is high enough to cause an electric discharge. However, positive polarity discharges are not desired in HS-WECDM, because the wire is damaged by positive discharges, leading to wire breaking after a short time. The purpose of the at least one first pulse of positive polarity is not to contribute to the cutting process itself, but to minimize the absolute value of the average inter-electrode voltage, and lastly to counter the anodic oxidation effect. For example, according to the invention, a positive polarity voltage $U_{o1}$ is applied and the gap is charged until a positive polarity ignition occurs, but ignition is immediately detected and a discharge is suppressed, as fast as possible. The discharge time $t_{e1}$ of a positive polarity pulse lasts not more than few microseconds, for instance 4 is. Thus, the ignition delay time of the positive pulse $t_{d1}$ is nearly equivalent to the positive polarity pulse duration $t_{i1}$. Wearing of the wire, which is so important for these HS-WECDM machines is hereby largely prevented.

Then, immediately after the at least one pulse of positive polarity, a negative polarity pulse is applied to the wire electrode, preferably only one negative polarity pulse in each pulse period is applied to the wire electrode. For example, in the case of normal discharge pulses, the gap is charged by applying a negative polarity open circuit voltage $U_{o2}$. Discharge typically begins with the ignition, after an ignition delay time $t_{d2}$. The negative polarity discharge having discharge voltage $U_{e2}$ is sustained during a discharge time $t_{e2}$, hereby cutting the work piece. This negative polarity pulse used with the invention is thus very similar to the conventional negative polarity pulse. Obviously, the process comprises various types of negative polarity pulses, which depend from the process conditions. Bad negative pulses are identified in known manner and are suppressed.

In an embodiment, the positive polarity open circuit voltage $U_{o1}$ applied in first pulse period is higher than a discharge voltage $U_{e1}$, typically in the range of +40 to +150V, for instance +70 V. With this voltage, a positive polarity discharge may normally occur, but according to the invention, the ignition is detected and the positive pulse is immediately stopped, for instance by immediate applying reversed pulse polarity. The advantage of a higher positive polarity voltage is that the pulse time $t_{i1}$ during which said positive voltage is applied can be comparably short, reducing the dead time and keeping up high cutting rates.

A first pulse with a comparably high open circuit voltage $U_{o1}$, is therefore much more effective than a Positive Pause Voltage pulse of same length, having a comparably low $U_{PPV}$. According to the invention, the occurrence of the positive polarity ignition is permitted, in order to fully exploit the positive polarity voltage, with the maximum contribution reduce the average gap voltage. Nevertheless, a positive polarity pulse is stopped if an ignition has not occurred after a predefined maximum ignition delay time $t_{d1max}$ as detailed further down.

Figure 7:
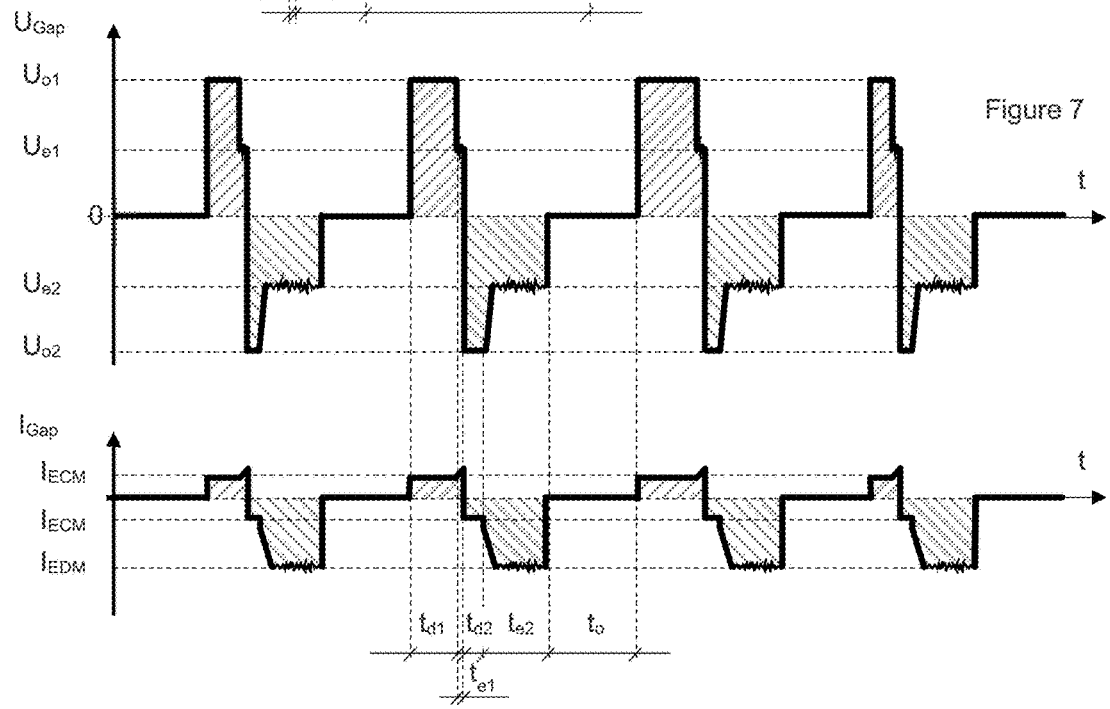
FIG. 7 Voltage and current waveforms of a HS-WECDM process according to the present invention.

FIG. 7 illustrates the bipolar voltage and current waveforms of a HS-WECDM process according to the invention.

According to an exemplary embodiment illustrated with reference to FIG. 7, the main phases of a normal pulse period used with a HS-WECDM comprises:

applying a positive voltage $U_{o1}$ at the gap (wire polarity positive), e.g. +70V during an ignition delay time $t_{d1}$;

as soon as the ignition is detected, the polarity of the voltage is instantaneously inverted from positive to negative, which stops the current and causes the immediate spark extinction;

immediately applying a negative voltage $U_{o2}$ at the gap e.g. −70V, during an ignition delay time $t_{d2}$;

after ignition, electrical discharge machining with negative polarity $U_{e2}$, e.g. −35V during a time $t_{e2}$; and, applying a pause time to between two consecutive pulses.

According to an embodiment of the invention, the positive polarity pulse is interrupted by inverting the polarity at the wire electrode, from positive to negative.

The positive polarity open circuit voltage $U_{o1}$ shall be possibly high and occurrence of an ignition is accepted. According to an embodiment of the invention, a positive polarity open circuit voltage $U_{o1}$ is higher than a positive discharge voltage $U_{e1}$. For instance, the positive polarity open circuit voltage $U_{o1}$=+70V and the negative polarity open circuit voltage $U_{o2}$=−70V. The discharge voltage $U_e$ mainly depends on the work piece material.

According to an embodiment of the invention, the gap voltage is measured, and an average gap voltage is computed, and one or more machining parameters is controlled to achieve a set-point average gap voltage.

The gap voltage is continuously compared with certain voltage thresholds, in real time. Moreover, the voltage is measured with a certain frequency, and the average gap voltage is computed, for example each 250 μs. The average gap voltage may be determined by making an approximate integration or a moving average. The deviation of the average gap voltage from the desired set-point average gap voltage serves as error signal to control at least a machining parameter. The one or more machining parameter is continuously adjusted as a function of the error signal. By appropriate control of the one or more machining parameters, the desired average gap voltage is achieved and maintained throughout the cutting process. Preferably, this is achieved within an average voltage control loop; the average voltage control loop is does not replace the main process control loop, which controls the gap width, dis-criminates and stops, bad sparks, etc.

According to an embodiment, a set-point average gap voltage is zero- or near-zero. According to another embodiment, a set-point average gap voltage includes a slightly positive gap voltage, for instance between 0V and +2V.

A slightly positive gap voltage is of advantage in certain cases. However, this is not generally applicable. The set-point average gap voltage is specific of the work piece material to be cut. In fact, certain materials are very sensitive to a negative average gap voltage. Other materials such as Inconel 718 are less sensitive, and can be machined with a slightly negative average gap voltage. This is to be taken into account in the setting of machining parameters, because the cutting speed, which is of primary importance, shall not be unnecessarily limited.

According to a further embodiment, the machining parameters which are controlled to achieve the desired average gap voltage include one or more of the following:

the number of positive pulses and/or negative pulses,
the positive polarity open circuit voltage $U_{o1}$ and/or negative polarity open circuit voltage $U_{o2}$,
the reference ignition delay time of negative pulses $t_{d2Ref}$, or the reference voltage of negative pulses $U_{o2Ref}$,
the maximum discharge time of the negative pulses $t_{e2max}$,
the maximum ignition delay time of the positive pulses $t_{d1max}$ and/or the maximum ignition delay time of the negative pulses $t_{d2max}$.
the feed rate.

In a first example, the number or the share of positive pulses is controlled to achieve a zero- or near-zero average gap voltage:
- if the average gap voltage is in a desired voltage range, near zero Volt, then the number of positive and negative pulses is not changed;
- if the average gap voltage is negative, below the desired voltage range, then the share of positive pulses is increased;
- if the average gap voltage is positive, above the desired voltage range, then the share of positive pulses is de-creased.

The share of positive pulses is increased, for instance by interrupting a fraction of the pulse periods after the positive polarity pulse, i.e. suppressing the negative pulse of a part of the pulse periods. Such pulses do not contribute to material removal but contribute to reduce the average gap voltage.

In a second example, the positive polarity open circuit voltage $U_{o1}$ and/or negative polarity open circuit voltage $U_{o2}$ is adjusted to achieve a zero- or near-zero average gap voltage. For instance, the positive polarity open circuit voltage $U_{o1}$ is controlled to achieve a zero- or near-zero average gap voltage:
- if the average gap voltage is in a desired voltage range, near zero Volt, then the positive polarity open circuit voltage $U_{o1}$ is not changed;
- if the average gap voltage is negative, below the desired voltage range, then the positive polarity open circuit voltage $U_{o1}$ is increased;
- if the average gap voltage is positive, above the desired voltage range, then the positive polarity open circuit voltage $U_{o1}$ is reduced.

A third example includes adjusting the reference ignition delay time of negative pulses $t_{d2Ref}$ or the reference voltage of negative pulses $U_{o2Ref}$. By adjusting one of these reference values the gap distance is controlled, which in turn affects the average ignition delay time, and the average gap voltage varies accordingly.

A fourth example includes limiting the discharge time $t_{e2}$ of the negative polarity discharges. For instance, a fraction of the pulse periods is interrupted after discharge time $t_{e2Max}$. By setting a maximum discharge time $t_{e2max}$, the negative contribution to average gap voltage is limited. However, varying the discharge time $t_{e2}$ of the negative polarity discharges has some disadvantages. On the contrary, so called iso-energetic negative pulses, having an ideal fixed length and shape are normally desirable for high cutting rates and low wire wear.

A further example includes controlling the feed rate. The feed rate determines the ignition delay time, respectively the size of the gap. Moreover, it determines the ratio or percentage of open circuit pulses, which will occur in the process.

By making the average gap voltage zero- or near-zero with the inventive method, the anodic oxidation is substantially reduced or suppressed, while the discharge frequency and the cutting rate remain high. The pause time to is not substantially prolonged, as it is the case when using PPV-pulses.

However, the combination of bipolar pulse periods according the present invention and the PPV-pulses is not excluded, and is the object of another embodiment, as explained further down.

In some embodiments, the machining parameters are controlled to get the desired average gap voltage, where the control interval is in the range of a less than a millisecond, up to 1000 milliseconds. A comparably long control interval may be of advantage to level the average voltage of the pulse periods of each the control interval.

In another embodiment, the machining parameters are controlled such as to get the desired average gap voltage in real- or near-real-time, means as fast as possible, at pulse level. Here, the approximated time integral of negative average gap voltage generated by a negative pulse, roughly $[(U_{o2} \times t_{d2})+(U_{e2} \times t_{e2})]$, is at least partially compensated by the approximated time integral of the positive average gap voltage generated by the positive pulse of the following pulse period, roughly $(U_{o1} \times t_{d1})$. As soon as the desired compensation by the positive pulse of the following pulse period is achieved, said following pulse is interrupted, and pulse polarity is inverted. In this case the approximated time integral is reset, and a new integral is started. Where the desired compensation by the positive pulse of the following pulse period is not fully achieved, the deviation is either ignored or compensated by the next one or more pulses. In this way, the desired average gap voltage is precisely and continuously achieved.

The real-time control of the machining parameters may be adopted in combination with the previously listed provisions to increase or decrease the average gap voltage, for instance by adjusting the gap compression.

According to an embodiment, a positive polarity pulse ignition is detected by identifying the gap voltage falling below of an ignition threshold $U_{thv3}$.

By immediate detection of the ignition, a discharge current $I_{e1}$ is almost prevented. In fact, the ignition i.e. the falling edge of the gap voltage falling below the ignition threshold can be detected very quickly, within few microseconds. The duration of ignition delay time $t_{d1}$ is thus nearly equal to the entire positive polarity pulse duration $t_{i1}$.

Figure 8:
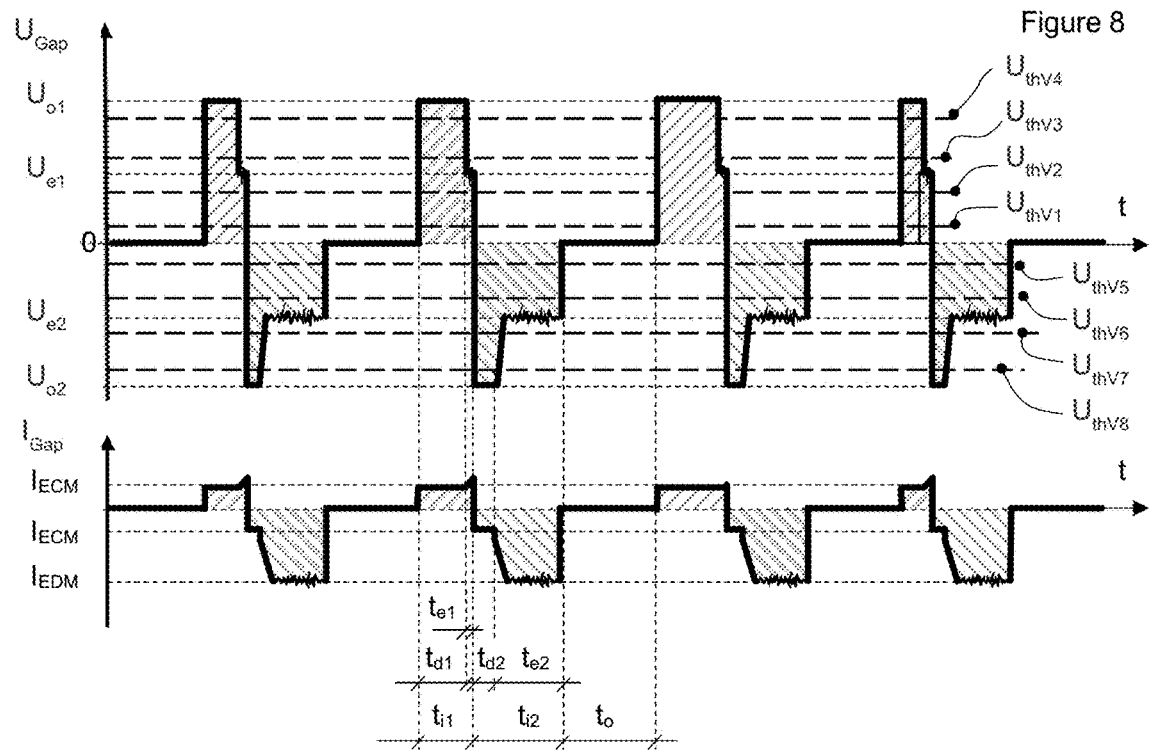
FIG. 8 Voltage and current waveforms of a HS-WECDM process according to the present invention.
Figure 9:
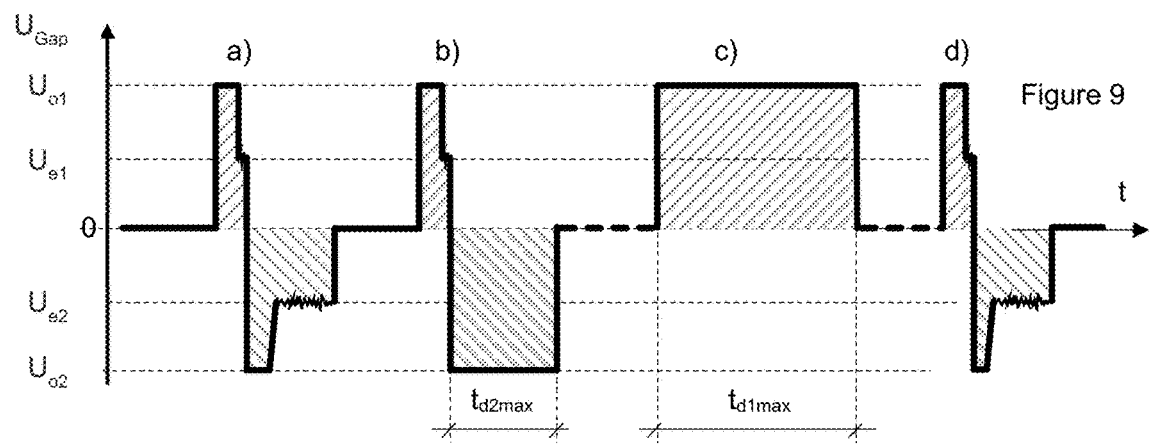
FIG. 9 Voltage and current waveforms of a HS-WECDM process according to the present invention.
Figure 10:
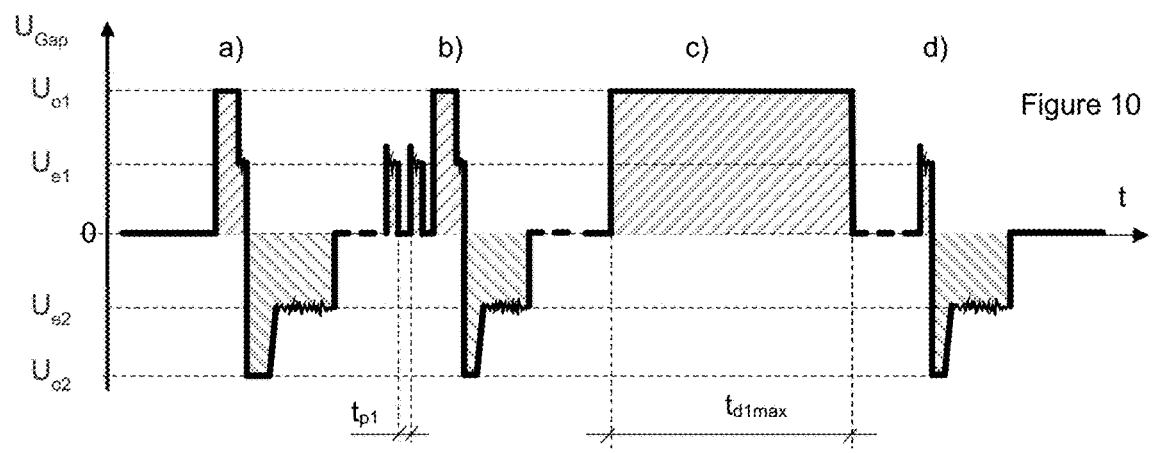
FIG. 10 Voltage and current waveforms of a HS-WECDM process according to the present invention.
Figure 11:
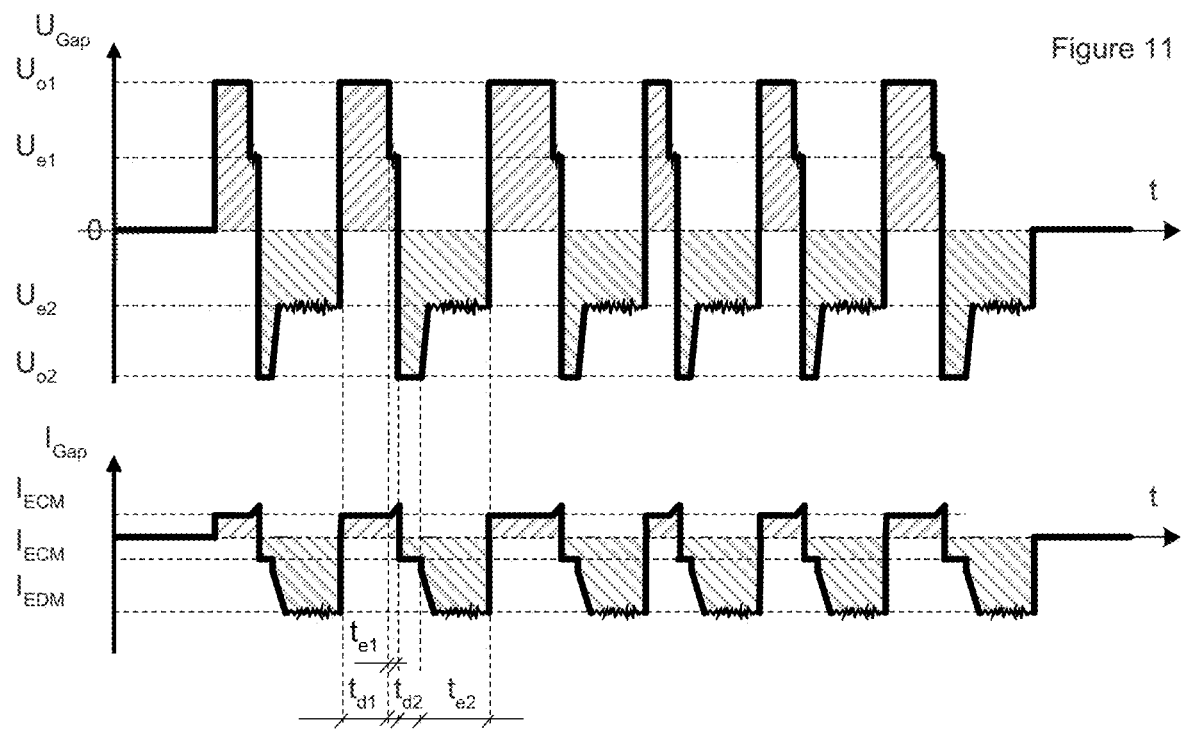
FIG. 11 Voltage and current waveforms of a HS-WECDM process according to the present invention.

FIG. 8 shows some typical thresholds which are used to detect the status of the gap, for discharge pulse classification and process control: Open circuit thresholds $U_{thv4}$, $U_{thv8}$, ignition delay thresholds $U_{thv3}$, $U_{thv7}$, arc thresholds $U_{thv2}$, $U_{thv6}$, and short circuit thresholds $U_{thv1}$, $U_{thv5}$. In case of normal pulses, when the positive polarity open circuit voltage $U_{o1}$ is applied to the gap, the gap voltage rising edge passes and stays briefly over threshold $U_{thv4}$, and then, at the ignition the gap voltage falls below threshold $U_{thv3}$. This last event triggers the interruption of the positive polarity pulse and reversing of the pulse polarity.

In a preferred embodiment, an ignition threshold is used to detect the positive polarity ignition. For better understanding, the following example uses the same ignition delay threshold $U_{thv3}$, but this is not to be understood as restrictive. For instance, the undershooting of threshold $U_{thv3}$ by the falling edge of the positive polarity pulse gap voltage is interpreted as the ignition; undershooting of threshold $U_{thv3}$ thus provokes the interruption of the positive polarity pulse.

The level of the ignition threshold is set between the discharge voltage $U_{e1}$ and the open circuit voltage $U_{o1}$. A typical ignition threshold level is around +50 V.

According to an embodiment of the invention, the ignition delay time $t_{d1}$ of positive polarity pulses is limited to a maximum ignition delay time, $t_{d1max}$ and/or the ignition delay time $t_{d2}$ of negative polarity pulses is limited to a maximum ignition delay time, $t_{d2max}$.

Hence, if a pulse has not ignited within a maximum ignition delay time $t_{d1max}$, respectively $t_{d2max}$ then that pulse is interrupted. For example, the negative pulse of the $2^{nd}$ pulse period shown in FIG. 9b) has not ignited within the maximum ignition delay time $t_{d2max}$ and has thus been interrupted. Another example is the positive pulse of the $3^{rd}$ pulse period shown in FIG. 9c), which has not ignited within the maximum ignition delay time $t_{d1max}$ and has thus been stopped. Suitable maximum ignition delay times, $t_{d1max}$ for the positive pulse and $t_{d2max}$ for the negative pulse are predefined.

In a typical embodiment of the invention shown exemplarily in FIG. 7, a negative polarity pulse follows immediately after the positive polarity pulse. By this provision, the average positive delay time $t_{d1avg}$ becomes mostly longer than the average negative delay time $t_{d2avg}$. This may be explained by the fact, that the gap is still partially ionized when the positive polarity pulse is interrupted. The ignition delay time of the adjacent negative polarity pulse $t_{d2}$ is thus typically shorter than the ignition delay time of the positive polarity pulse $t_{d1}$. This reduces the average gap voltage, however this is generally not sufficient to achieve the zero- or near zero average gap voltage.

Preferably, a maximum positive ignition delay time $t_{d1max}$ is longer than a maximum negative ignition delay time $t_{d2max}$.

FIG. 9b) shows a negative pulse which has not ignited and which has been stopped at $t_{d1max}$, and FIG. 9c) shows a positive pulse which has not ignited and which has been stopped at $t_{d2max}$. As illustrated in this example, $t_{d1max}$ is considerably longer than $t_{d2max}$. For instance, the maximum ignition delays times are $t_{d1max}=150$ μs and $t_{d1max}=50$ μs, means $t_{d1max}/t_{d1max}=\frac{1}{3}$.

With moderate compression (i.e. comparably large gap), open pulses occur relatively often, thus a longer average positive delay time $t_{d1avg}$ is achieved by setting the maximum positive ignition delay time $t_{d1max}$ longer than the maximum negative ignition delay time $t_{d2max}$.

In an embodiment, the maximum negative ignition delay time $t_{d1max}$ is a preset constant value, and the maximum positive ignition delay time $t_{d1max}$ is adjusted as needed. If the average gap voltage is excessively positive, then the maximum positive ignition delay is reduced. On the other hand, if the average gap voltage is excessively negative, then the maximum positive ignition delay is increased.

In a further embodiment, if there is no ignition of the positive polarity pulse within the maximum positive ignition delay time $t_{d1max}$, or within a predefined limit positive ignition delay time $t_{d1Lim}$, then the negative polarity pulse is suppressed.

Moreover, the inter-electrode distance (Gap) may be adjusted to control the average ignition delay time, affecting the average gap voltage. For instance, by reducing the gap compression, open pulses are more likely to occur. In combination with the provisions cited in the foregoing paragraphs, a zero- or near-zero average gap voltage is quickly achieved.

Since any positive polarity pulse discharge is immediately stopped, the gap is not contaminated by new particles removed from the work piece, new bubbles and the like, so that the spark-free positive polarity pulse duration $t_{i1} \sim t_{d1}$ has somehow the effect of a pulse pause. In fact, the pulse pause can be reduced due to the "spark-free" positive polarity pulses.

As said, ignition of positive polarity pulses is identified by monitoring the gap voltage falling below an ignition threshold, in view of immediate interruption. However, not all unwanted positive polarity pulses can be identified in this way; certain pulses do not build up the open circuit voltage in the gap respectively the characteristic ignition delay, and may directly evolve to a normal discharge or an arc, with no ignition. Early positive polarity pulses are characterized by an ignition at the rising edge, while the open circuit voltage is applied to the gap.

Figure 13A:
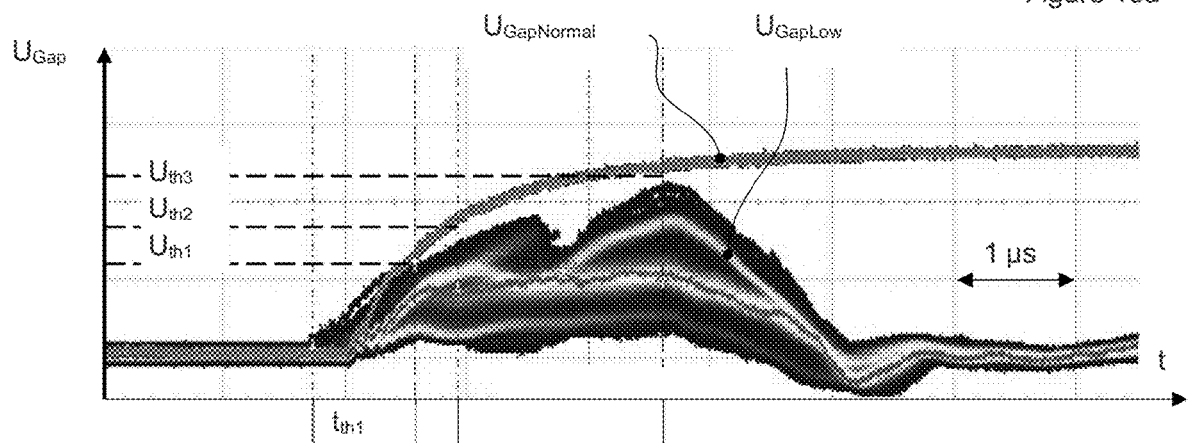
FIG. 13a Multiple superposed voltage plotting.

Certain such early positive polarity pulses do not have the desired steepness at the rising edge of the gap voltage, and are not wanted. FIGS. 13a, b and 14 show voltage and current waveforms in a very stretched time scale of 1 μs/division. The graph show a large quantity of superposed pulse plottings, where recording starts at the instant in which the open circuit voltage is applied to the gap. The gap voltage waveform of normal pulses $U_{GapNormal}$ is very repeatable, with very low spread. In contrast, the gap voltage curve of "weak" pulses $U_{GapLow}$ has different slope and shape, and considerable variance. Another aspect of the present invention is therefore addressed to the recognition and suppression of these weakly developing positive polarity pulses, in particular positive polarity pulses having low voltage slope.

Therefore, in a preferred embodiment, a positive polarity pulse is immediately interrupted if the gap voltage does not exceed at least one voltage threshold $U_{th1}$ ($U_{th2}$, $U_{th3}$, ...) within a predefined time $t_{th1}$ ($t_{th2}$, $t_{th3}$, ...) after applying the positive polarity open circuit voltage $U_{o1}$.

Weak positive polarity pulses can thus be identified by setting the voltage thresholds $U_{th}$, in combination with time recordings $t_{th}$. These weak positive polarity pulses are interrupted, because of their small contribution to the reduction of the average gap voltage.

However, these weak positive polarity pulses still contribute to reduce an average negative gap voltage. Thus, according to an embodiment, a short pause $t_{p1}$ is applied after the interruption of the positive polarity pulse, and after said short pause $t_{p1}$ a further positive polarity pulse is applied to wire electrode. Several weak positive polarity pulses can be applied to contribute to the reduction of the average negative gap voltage. In some cases, as shown in FIG. 10b), after one or more attempts, the gap voltage may surpass the open voltage threshold, forming the characteristic ignition delay waveform.

Figure 13B:
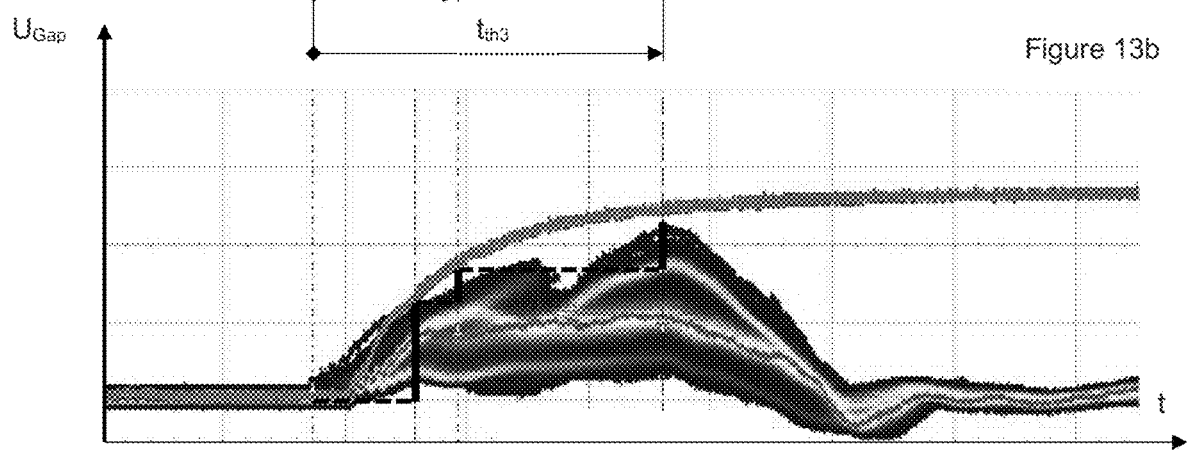
FIG. 13b Multiple superposed voltage plotting.
Figure 14:
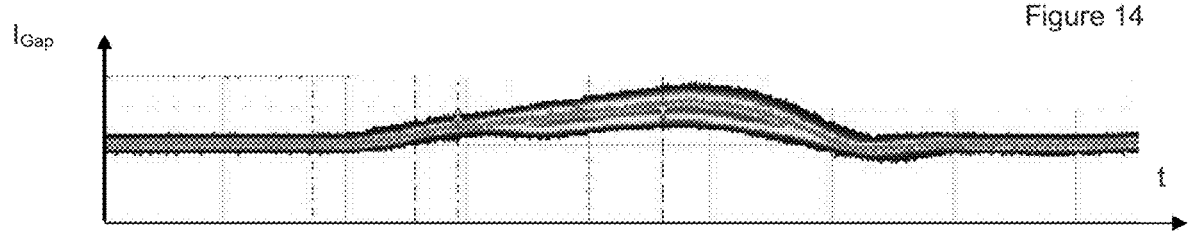
FIG. 14 Multiple superposed current plotting

A preferred embodiment includes a mask filter including a plurality of threshold points ($U_{th}$;$t_{th}$). FIG. 13b shows an example in which a mask of three threshold points is used to discriminate the low steepness pulses.

According to another embodiment, the positive polarity pulses and negative polarity pulses used by the inventive method are combined with the earlier described Positive Pause Voltage pulses. In this case, both the positive polarity pulse and the PPV-Pulse may contribute to level the average gap voltage near zero.

In this embodiment, the high-speed wire electrochemical-discharge cutting method according the invention is further, a Positive Pause Voltage pulse is applied in a pulse pause, and a voltage $U_{PPV}$ of the Positive Pause Voltage pulse is lower than a discharge voltage $U_{e1}$ of the first pulse.

Figure 12:
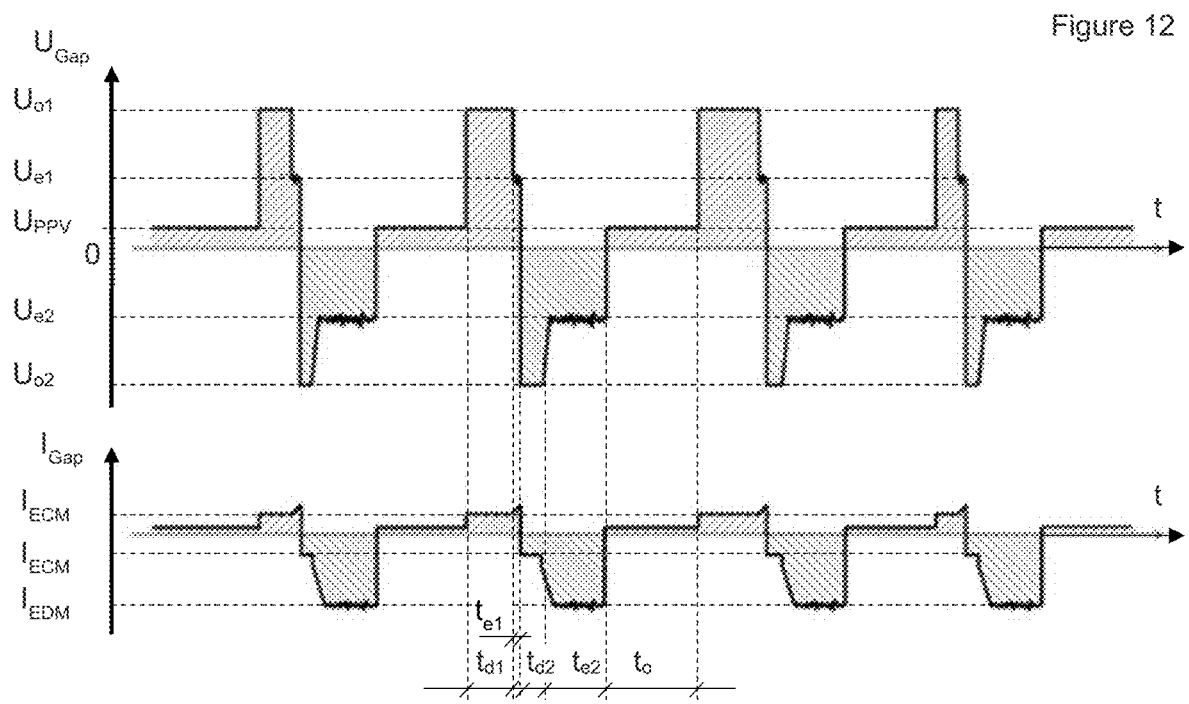
FIG. 12 Voltage and current waveforms of a HS-WECDM process according to the present invention.

FIG. 12 illustrates voltage and current waveforms of a HS-WECDM process according to this embodiment. Here, the provision of a positive polarity voltage $U_{o1}$ applied in a first pulse is combined with a Positive Pause Voltage pulse at voltage $U_{PPV}$ to get a zero or near zero average voltage. The PPV-pulse is applied to the gap in the pause $t_o$ between two consecutive pulse periods. The PPV-pulse can be applied to a part or the entire pause. For instance, the first pulse having a positive polarity voltage at the wire is preceded by a PPV-pulse.

According to the embodiment illustrated with reference to FIG. 12, the main phases of a normal pulse period including a PPV-pulse, used with a HS-WECDM comprises:

applying a positive voltage $U_{o1}$ at the gap (wire polarity positive) during an ignition delay time $t_{d1}$;

as soon as the ignition is detected, the polarity of the voltage is instantaneously inverted from positive to negative, which stops the current and causes the immediate spark extinction;

immediately applying a negative voltage $U_{o2}$ at the gap during an ignition delay time $t_{d2}$;

after ignition, electrical discharge machining with negative polarity $U_{e2}$ during a time $t_{e2}$; and, applying a Positive Pause Voltage in a pause time $t_o$ between two consecutive pulses.

According to a further embodiment, the average gap voltage is computed after each one or more pulses, and the voltage $U_{PPV}$ and/or the duration $t_{PPV}$ of the PPV-pulse is adjusted to achieve the desired set-point average gap voltage. In this embodiment the PPV-pulses are tuned to get zero average voltage, for instance by adjusting the PPV-pulse voltage and/or duration.

The invention claimed is:

1. High-speed wire electrochemical-discharge cutting method (HS-WECDM), in which a work piece is processed by means of a wire electrode, in which consecutive negative polarity pulses are applied at said wire electrode, the negative polarity pulses having open circuit voltage $U_{o2}$, thereby at least partially developing discrete electrical discharges, the method further comprising: applying positive polarity pulses at the wire electrode between the negative pulses, the positive polarity pulses having a positive polarity open circuit volt-age $U_{o1}$, and that an ignition occurring with each positive polarity pulse is immediately detected, and that the positive polarity pulses are immediately interrupted.

2. HS-WECDM cutting method according to claim 1, wherein consecutive pulse periods are applied to the gap be-tween said work piece and said wire electrode, and that the pulse periods comprise at least one positive polarity pulse at the wire electrode in which a positive open circuit voltage $U_{o1}$ is applied, and that the pulse periods further comprise a negative polarity pulse at the wire electrode in which a negative open circuit voltage $U_{o2}$ is applied, and that an ignition occurring in the course of said at least one positive polarity pulse is immediately detected, and that such positive polarity pulse is immediately interrupted, and that the negative polarity pulse is applied immediately after the positive polarity pulse, and that a negative polarity discharge occurring in said negative polarity pulse is sustained during a discharge time $t_{e2}$.

3. HS-WECDM cutting method according to claim 1, wherein the positive polarity pulse is interrupted by inverting the pulse polarity at the wire electrode, from positive to negative.

4. HS-WECDM cutting method according to claim 1, wherein the positive polarity open circuit voltage $U_{o1}$ is higher than a positive discharge voltage $U_{e1}$.

5. HS-WECDM cutting method according to claim 1, wherein a gap voltage is measured, and that an average gap voltage is computed, and that one or more machining parameters is controlled to achieve a set-point average gap voltage.

6. HS-WECDM cutting method according to claim 5, wherein the set-point average gap voltage is zero- or near-zero.

7. HS-WECDM cutting method according to claim 1, wherein machining parameters which are controlled to achieve a desired average gap voltage include one or more of the following:
   a. the number of positive pulses and/or negative pulses,
   b. the positive polarity open circuit voltage $U_{o1}$ and/or negative polarity open circuit voltage $U_{o2}$,
   c. a reference ignition delay time of negative pulses $t_{d2Ref}$, or a reference voltage of negative pulses $U_{o2Ref}$,
   d. a maximum discharge time of the negative pulses $t_{e2max}$;
   e. a maximum ignition delay time of the positive pulses $t_{d1max}$ and/or maximum ignition delay time of the negative pulses $t_{d2max}$;
   f. the feed rate.

8. HS-WECDM cutting method according to claim 1, wherein an approximated time integral of negative average gap voltage generated by a negative pulse is at least partially compensated by an approximated time integral of the positive average gap voltage generated by the positive pulse of the following pulse period.

9. HS-WECDM cutting method according to claim 1, wherein positive polarity pulse ignition is detected by identifying a gap voltage falling below of an ignition threshold $U_{thV3}$.

10. HS-WECDM cutting method according to claim 1, wherein an ignition delay time $t_{d1}$ of the positive polarity pulse is limited to a maximum ignition delay time, $t_{d1max}$, and/or an ignition delay time $t_{d2}$ of negative polarity pulses is limited to a maximum ignition delay time, $t_{d2max}$.

11. HS-WECDM cutting method according to claim 1, wherein a maximum ignition delay time $t_{d1max}$ of the positive pulse is longer than a maximum ignition delay time $t_{d2max}$ of the negative pulse.

12. HS-WECDM cutting method according to claim 1, wherein the positive polarity pulse is immediately interrupted if a gap voltage does not exceed at least one threshold $U_{th1}$ ($U_{th2}$, $U_{th3}$, ...) within a predefined time $t_{th1}$ ($t_{th2}$, $t_{th3}$, ...) after the application of the positive polarity open circuit voltage $U_{o1}$.

13. HS-WECDM cutting method according to claim 12, wherein a short pause $t_{p1}$ is applied after the interruption of the positive polarity pulse, and that after said short pause $t_{p1}$ a further positive polarity pulse is applied to wire electrode.

14. HS-WECDM cutting method according to claim 1, wherein a Positive Pause Voltage pulse is applied in a pulse pause $t_o$, and that a voltage $U_{PPV}$ of the Positive Pause Voltage pulse is lower than a discharge voltage $U_{e1}$.

15. HS-WECDM cutting method according to claim 13, wherein an average gap voltage is computed after each one or more pulses, and that a voltage $U_{PPV}$ and/or a duration $t_{PPV}$ of the PPV-pulse is adjusted to achieve a desired average gap voltage.

* * * * *